(12) United States Patent
Frie et al.

(10) Patent No.: US 9,630,879 B2
(45) Date of Patent: Apr. 25, 2017

(54) METHOD AND SYSTEM FOR PRODUCING CEMENT CLINKER FROM RAW CEMENT MIXTURE

(71) Applicant: THYSSENKRUPP INDUSTRIAL SOLUTIONS AG, Essen (DE)

(72) Inventors: Sebastian Frie, Münster (DE); Sebastian Oberhauser, Hamburg (DE)

(73) Assignee: THYSSENKRUPP INDUSTRIAL SOLUTIONS AG, Essen (DE)

( * ) Notice: Subject to any disclaimer, the term of this patent is extended or adjusted under 35 U.S.C. 154(b) by 0 days.

(21) Appl. No.: 14/412,504

(22) PCT Filed: Jul. 2, 2013

(86) PCT No.: PCT/EP2013/063931
§ 371 (c)(1),
(2) Date: Jan. 2, 2015

(87) PCT Pub. No.: WO2014/006042
PCT Pub. Date: Jan. 9, 2014

(65) Prior Publication Data
US 2015/0183686 A1    Jul. 2, 2015

(30) Foreign Application Priority Data
Jul. 4, 2012 (DE) .................. 10 2012 105 977

(51) Int. Cl.
*C04B 7/48* (2006.01)
*C04B 7/36* (2006.01)
(Continued)

(52) U.S. Cl.
CPC .............. *C04B 7/367* (2013.01); *C04B 7/006* (2013.01); *C04B 7/434* (2013.01); *C04B 7/48* (2013.01);
(Continued)

(58) Field of Classification Search
CPC .................................. C04B 7/367; C04B 7/48
See application file for complete search history.

(56) References Cited

U.S. PATENT DOCUMENTS

| 2001/0007232 A1 | 7/2001 | Kuhnke et al. |
| 2009/0101050 A1 | 4/2009 | Lackner et al. |

(Continued)

FOREIGN PATENT DOCUMENTS

| CN | 101541702 A | 9/2009 |
| CN | 102219409 A | 10/2011 |

(Continued)

OTHER PUBLICATIONS

Machine Translation into English for DE 10 2008 023 899 A1 (Nov. 19, 2009) Kreft.*

(Continued)

*Primary Examiner* — Paul Marcantoni
(74) *Attorney, Agent, or Firm* — thyssenkrupp North America, Inc.

(57) ABSTRACT

The invention relates to a method and a system for producing cement clinker from raw cement mixture, wherein one part of the raw cement mixture is preheated in a calciner preheater, and the other part of the raw cement mixture is preheated in an oven preheater, the preheated raw cement mixture is pre-calcined in a calciner which is operated according to the oxyfuel method, the pre-calcined raw cement mixture is fired in an oven, the fired raw cement mixture is cooled in a cooler, the calciner preheater is operated using exhaust gases of the calciner, the oven preheater is operated using exhaust gases of the oven, an entrained flow reactor is used as the calciner, a part of the calciner exhaust gas being recirculated to the calciner after being used in the calciner preheater, and the oven exhaust gas undergoes a post-combustion $CO_2$ separation.

8 Claims, 3 Drawing Sheets

(51) Int. Cl.
*C04B 7/43* (2006.01)
*F27B 7/20* (2006.01)
*F27D 17/00* (2006.01)
*C04B 7/00* (2006.01)

(52) U.S. Cl.
CPC .......... *F27B 7/2016* (2013.01); *F27B 7/2033* (2013.01); *F27D 17/008* (2013.01); *Y02P 40/121* (2015.11); *Y02P 40/18* (2015.11)

(56) References Cited

U.S. PATENT DOCUMENTS

| 2010/0000446 A1 | 1/2010 | Penfornis et al. |
| 2013/0040546 A1 | 2/2013 | Noeske et al. |

FOREIGN PATENT DOCUMENTS

| DE | 102008059370 A1 | 6/2010 |
| DE | 10 2010 012 143 A1 | 9/2011 |
| DE | 102008023899 B4 | 1/2012 |
| JP | 2008239359 A | 10/2008 |
| WO | 2008/059378 A2 | 5/2008 |
| WO | 20101046345 A1 | 4/2010 |
| WO | 2011/015207 A1 | 2/2011 |
| WO | 2011/138022 A1 | 11/2011 |

OTHER PUBLICATIONS

German Language International Search Report for International patent application No. PCT/EP2013/063931; mailing date Oct. 11, 2013.

English Translation of International Search Report for International patent application No. PCT/EP2013/063931; mailing date Oct. 11, 2013.

English Translation of abstract of DE 102008059370 (A1).
English Translation of abstract of JP 2008239359 (A).
English Translation of abstract of DE 102008023899 (B4).
English Translation of abstract of CN 102219409 (A).

* cited by examiner

METHOD AND SYSTEM FOR PRODUCING CEMENT CLINKER FROM RAW CEMENT MIXTURE

CROSS REFERENCE TO RELATED APPLICATIONS

This application is a U.S. National Stage Entry of International Patent Application Serial Number PCT/EP2013/063931, filed Jul. 2, 2013, which claims priority to German patent application no. 102012105977.2, filed Jul. 4, 2012.

FIELD

The invention relates to a process and a plant for producing cement clinker, in which cement raw meal is preheated, calcined and subsequently fired in a furnace to give cement clinker.

BACKGROUND

In the production of cement clinker, about 0.53 kg of $CO_2$/kg of clinker are formed in the calcination of the raw meal and about 0.26-0.29 kg of $CO_2$/kg of clinker are formed in the combustion of the fuel required. These amounts of $CO_2$ are usually emitted into the atmosphere. Depending on the number of cyclone preheating stages and the radiation and convection losses, the specific fuel energy requirement is 2800-3200 kJ/kg of clinker. For this reason, processes in which the $CO_2$ formed is substantially concentrated in the exhaust gas and the $CO_2$ is subsequently liquefied and stored for the long term in suitable geological formations or is utilized for further purposes have been discussed.

DE 10 2008 023 899 B4 describes a process for reducing the $CO_2$ emission in the production of cement clinker, in which a lime-rich material component and a low-lime material component are preheated in separate preheaters, calcined in a joint calciner and subsequently fired in a furnace to give cement clinker. Here, the exhaust gases from the calciner are utilized in the preheater for preheating the lime-rich material component and the exhaust gases from the furnace are utilized in the preheater for preheating the low-lime material component. Furthermore, fuel and pure oxygen are introduced for combustion into the calciner so as to form a calciner exhaust gas which contains predominantly carbon dioxide and water vapor. The exhaust gas from the preheater for preheating the lime-rich material component is at least partly recirculated as circulation gas to the calciner in order to be introduced there as carrier gas.

WO 2008/059378 A2 discloses a process for producing cement in which the raw meal is firstly preheated by means of exhaust gas from the rotary tube furnace (1100-1300° C.) and is subsequently mostly calcined separated from the furnace exhaust gas on the gas side by means of oxy-fuel firing in the calciner. In oxy-fuel firing, oxygen is used as oxidant instead of air; the oxygen can be produced by means of one of the processes discussed for oxygen production (cryogenic, adsorptive, membrane processes). A $CO_2$-rich calciner exhaust gas is produced in this way. The raw meal is separated out from the oxy-fuel flue gas by means of a cyclone and goes into the rotary tube furnace. The calciner exhaust gas has to be cooled in order for a substream subsequently to be recirculated to the oxy-fuel combustion. During cooling of the flue gas, process steam or steam for power generation, for example, can be produced. However, such utilization of the calciner exhaust gas results in a significantly increased fuel energy requirement for cement production since the exhaust gas is in this case not utilized for preheating the raw meal. Compared to conventional cement production, the fuel energy requirement alone would possibly increase by up to 70% to above 5000 kJ/kg of clinker. In addition, industrial practice shows that a heat exchanger is very difficult to operate at gas entry temperatures of 850-950° C. and at the same time high dust loadings of some hundreds of grams per cubic meter: the dust adheres strongly and is very difficult to clean off because of the high temperatures. Conventional cleaning methods fail here because of the high temperatures and the resulting weakening of materials therefrom.

WO 2010/046345 proposes that a calciner operating according to the stationary fluidized bed principle be used instead of a calciner configured as entrained flow reactor. Since no pneumatic transport of the raw meal within the calciner is therefore necessary, this concept promises to make do with no or only very little flue gas recirculation. It is therefore necessary to cool and recirculate no or only very little flue gas and the exhaust gas can be utilized as usual for preheating the raw material. The fuel energy requirement in this process is therefore no higher or only slightly higher than in the case of the classical production of cement using a preheater oven.

As a result of configuration of the calciner as stationary fluidized bed, significantly less precalcined hot meal gets into the oxy-fuel flue gas path to be cooled. Possible recarbonating effects can be minimized in this way. The heat from the oxy-fuel flue gas is used as heat source for a post-combustion unit for absorption of $CO_2$ from the furnace exhaust gas and subsequent desorption of the relatively pure $CO_2$ from the scrubbing solution. In addition, the waste heat from the exhaust air stream from the cooler is employed here as additional heat source for the desorption.

However, a detailed examination of the fluidized bed concept shows that a fluidized-bed calciner would require very large cross-sectional areas despite pure oxygen operation since in the case of the typically very fine raw meal a stationary fluidized bed can no longer be established even at very low gas velocities. The advantage of the low recarbonating would therefore no longer be present and the disadvantages of the fluidized bed in the form of very large construction volumes and high pressure drops would predominate.

SUMMARY

It is therefore an object of the invention to improve the process and the plant for producing cement clinker in order to achieve a higher degree of removal of $CO_2$ without significantly increasing the fuel requirement in the process.

BRIEF DESCRIPTION OF THE DRAWINGS

The present disclosure is described in detail below with reference to the attached drawing figure, wherein.

DETAILED DESCRIPTION

Figure 1:
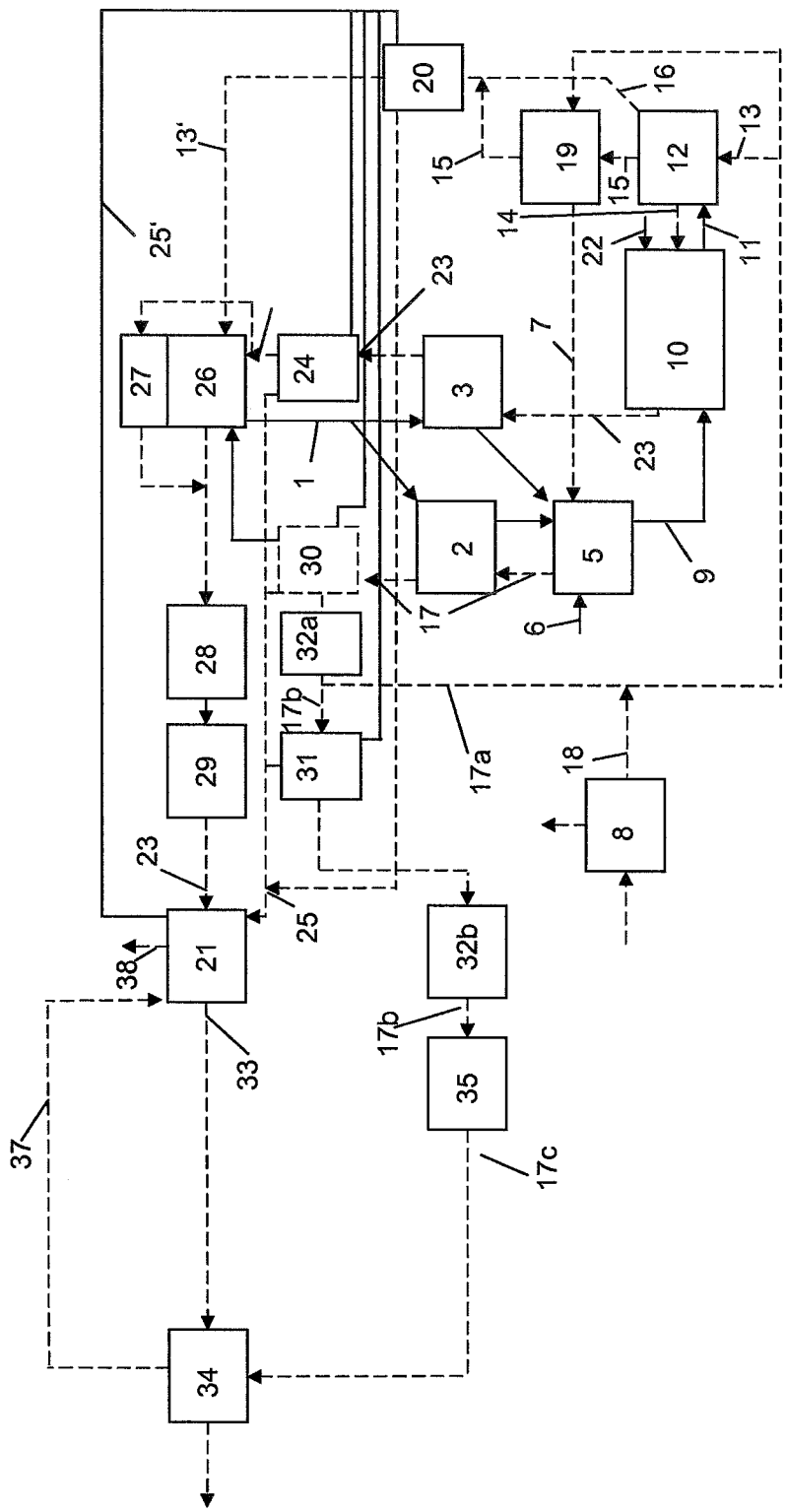
FIG. 1 is a schematic diagram of an embodiment of a plant layout for producing cement clinker with joint $CO_2$ work-up, as disclosed herein.

The process of the invention for producing cement clinker from cement raw meal comprises the following steps
- part of the cement raw meal is preheated in a calciner preheater and the other part of the cement raw meal is preheated in a furnace preheater,
- the cement raw meal which has been preheated in the calciner preheater (2) and in the furnace preheater (3) is precalcined in a calciner operated by the oxy-fuel process,
- the precalcined cement raw meal is fired in a furnace,
- the fired cement raw meal is cooled in a cooler,
- the calciner preheater is operated using calciner exhaust gases from the calciner and
- the furnace preheater is operated using furnace exhaust gases from the furnace,
- wherein an entrained flow reactor is used as calciner, with a part of the calciner exhaust gas being, after having been utilized in the calciner preheater, recirculated to the calciner and
- the furnace exhaust gas is subjected to a post-combustion removal of $CO_2$.

The plant of the invention for producing cement clinker from cement raw meal consists essentially of
- a calciner preheater for preheating a first part of the cement raw meal,
- a furnace preheater for preheating a second part of the cement raw meal,
- a calciner for precalcining the cement raw meal which has been preheated in the calciner preheater (2) and in the furnace preheater (3),
- a furnace for firing the precalcined cement raw meal,
- a cooler for cooling the fired cement raw meal,
- where the calciner preheater is operated using calciner exhaust gases from the calciner and
- the furnace preheater is operated using furnace exhaust gases from the furnace,
- wherein the calciner is configured as an entrained flow reactor and is equipped with means for recirculating a part of the calciner exhaust gases after utilization in the calciner preheater and
- a post-combustion unit for the removal of $CO_2$ is arranged downstream of the furnace preheater in the flow direction of the furnace exhaust gas.

For the purposes of the present invention, a calciner operated by the oxy-fuel process is a calciner in which fuel and combustion air are used with a proportion of oxygen of at least 75 mol %, preferably at least 95 mol %.

An embodiment of the calciner as conventional entrained flow reactor with flue gas recirculation is significantly simpler to implement. In addition, experiments have shown that the recarbonating effects to be expected within the calciner exhaust gas are less significant than expected.

Further embodiments of the invention are subject matter of the dependent claims.

The post-combustion unit is preferably a classical flue gas scrubber in which a low-$CO_2$ solvent which preferably absorbs $CO_2$ and thus frees the flue gas of $CO_2$ is injected. The $CO_2$-rich solvent is freed again of the $CO_2$ with the aid of process waste heat in order to be able to be injected again as low-$CO_2$ solvent for the absorption of $CO_2$, so that it can be operated in a circuit.

As an alternative, it can, however, also be solids-based post-combustion units in which the $CO_2$ present in the flue gas reacts with a solid to form a carbonate compound and this carbonate is calcined again using the process waste heat (known as carbonate looping). Carbonates here are preferably calcium, magnesium and sodium carbonates. Cement raw meal itself can therefore also be used. However, a significantly higher temperature level would be expected for the heat of regeneration in the case of the carbonate looping principle.

In a particular embodiment of the invention, the heat requirement for the post-combustion removal of $CO_2$ is at least partly, but preferably completely, covered by the waste heat of at least part of the calciner exhaust gas, of the furnace exhaust gas and/or of an exhaust gas from the cooler. Here, the heat requirement for the post-combustion removal of $CO_2$ can be partly covered by the waste heat of the unrecirculated calciner exhaust gas after utilization in the calciner preheater or partly by the waste heat of the furnace exhaust gas after utilization in the furnace preheater.

Furthermore, it can be provided for the part of the calciner exhaust gas which is recirculated to the calciner to be heated directly or indirectly by exhaust gases from the cooler. The unrecirculated part of the calciner exhaust gas is preferably subjected to removal of $CO_2$, in particular $CO_2$ liquefaction. In general, the calciner exhaust gas before various impurity sources have been separated off is not of sufficient purity for further transport and storage/utilization. The $CO_2$ purity therefore has to be increased further in the stream to be separated off. For this reason, processes as discussed above in which a single or multiple phased removal is employed, with predominantly $CO_2$, based on the mass flow, being present in the liquid phase while the elements which are difficult to liquefy, e.g. oxygen, nitrogen and argon, accumulate in the gas phase, have been proposed. However, this gas phase sometimes still contains high concentrations of $CO_2$. It is therefore useful to pass this gas-phase stream, also referred to as vent gas, together with the furnace exhaust gas to the post-combustion removal of $CO_2$. In a preferred embodiment, the calciner exhaust gas after utilization in the calciner preheater and/or the furnace exhaust gas after utilization in the furnace preheater is fed to a waste heat boiler for generating process steam (water vapor), with the process steam generated being used in the post-combustion removal of $CO_2$.

Furthermore, efforts are made to match the oxy-fuel process and the post-combustion removal of $CO_2$ to one another in such a way that an energetically optimal state for virtually complete removal of $CO_2$ is established. This state is established when the available process waste heat from the unrecirculated calciner exhaust gas, the furnace exhaust gas and/or an exhaust gas from the cooler can be utilized completely for the post-combustion removal of $CO_2$. An available excess of process heat can be compensated by means of decreasing the degree of calcination in the calciner and the preheater thereof. This would offer the advantage of energy saving in the provision of oxygen used there. The $CO_2$ occurring in an increased amount in the furnace exhaust gas as a result can be separated off by means of sufficient available waste heat.

An existing deficiency of process heat, on the other hand, could be compensated by means of increasing the degree of calcination in the calciner and the preheater thereof. Consequently, the content of $CO_2$ in the furnace exhaust gas is increased in the case of an excess of process heat, while the content of $CO_2$ in the furnace exhaust gas is decreased in the case of a deficiency of process heat. Two adjustment parameters are available for varying the degree of calcination: the degree of calcination at the calciner outlet can be increased or decreased by means of higher or lower amounts of fuel in the calciner. The degree of calcination of the raw material in the calciner and the preheater thereof can be increased or decreased by means of higher or lower amounts of material fed into the furnace preheater.

Further advantages and embodiments of the present disclosure are illustrated with reference to the following description and the enclosed drawing figures.

In the plant shown in FIG. 1 for producing cement clinker, cement raw meal 1 is preheated in two preheaters which are separated on the gas side, namely a calciner preheater 2 and a furnace preheater 3, and the preheated raw meal 4 is subsequently precalcined in a calciner 5 designed as an entrained flow reactor. This calciner is operated by the oxy-fuel process using fuel 6 and combustion gas 7. The combustion gas is formed in the illustrative embodiment shown by a mixture of a recirculated part 17a of the calciner exhaust gas 17 and an oxygen-rich gas stream 18 produced in an air fractionation plant 8 by one of the conventional methods (cryogenic air fractionation, adsorptive methods, membrane technology) and has an oxygen content of at least 75 mol %, preferably at least 95 mol %. In conventional cryogenic processes, the consumption of electric energy at present is in the range from 250 kWh/$t_{O2}$ to 300 kWh/$t_{O2}$ at an oxygen purity of about 99.5%. If the purity requirements for the oxygen are lower, the electric energy consumption can be reduced. The electric energy consumption can be decreased to 160 kWh/$t_{O2}$ by improved integration and, for example, use of the "three-column technique".

The precalcined cement raw meal 9 subsequently goes into a furnace 10 configured as a rotary tube furnace in which it is heated further to 1300-1500° C. and fully calcined and reacts to form the characteristic clinker phases. In the subsequent cooler 12, the hot cement clinker 11 is subsequently cooled to 50° C.-250° C. In the concept proposed, cooling of the clinker is effected by means of cooling gas 13, forming exhaust gas 14, 15 and 16 from the cooler having various temperatures. The hottest exhaust gas 14 from the cooler is formed at the beginning of the clinker cooler 12 which directly adjoins the rotary tube furnace 10. It is used as "secondary air" as combustion air in the conventional furnace firing. The exhaust gas 15 from the cooler from a middle part of the clinker cooler 12 (middle air) is utilized for preheating the combustion gas 7 in an indirect heat exchanger 19. Given a minimal temperature difference in this heat exchanger, there is an energetically optimum proportion of exhaust gas 15 from the cooler (middle air) for preheating the combustion gas 7 which is made up of the recirculated part 17a of the calciner exhaust gas 17 and the oxygen-rich gas stream 18 and is preheated here to up to 700° C.

A constructionally simpler solution in which the exhaust gas 15 from the cooler (middle air) is taken off without physical separation together with the exhaust gas 16 from the cooler in order to be utilized for preheating the combustion gas 7 in an indirect heat exchanger 19 is also conceivable. The mixed gas composed of exhaust gas 15 and 16 from the cooler would consequently have a significantly lower temperature and the combustion gas 7 could accordingly be preheated only to lower values.

As an alternative, it would also be conceivable for the combustion gas 7 made up of the recirculated part 17a of the calciner exhaust gas 17 and the oxygen-rich gas stream 18 to be fed as part of the cooling gas 13 to the clinker cooler in order then to utilize the resulting exhaust gas from the cooler directly as preheated combustion gas 7 in the calciner. In this alternative, the combustion gas would be preheated directly by means of the hot cement clinker to up to 1000° C. However, this option would involve demanding constructional requirements in the structure of the cooler.

The exhaust gas 15 from the cooler exiting from the heat exchanger 19 and also the remaining exhaust gas 16 from the clinker cooler 12 can be utilized for generating process steam 25 in the waste heat boiler 20 for providing heat to a post-combustion unit 21 for removal of $CO_2$. The exhaust gas 13' from the cooler which has been cooled in the waste heat boiler 20 can, for example, be utilized in a raw material mill 26 for drying the cement raw material or raw meal 1.

In the furnace 10, fuel 22 is burnt by means of preheated secondary air (=exhaust air 14) and an unpreheated proportion of primary air and after leaving the furnace goes as furnace exhaust gas 23 into the furnace preheater 3. After utilization in the furnace preheater 3, the furnace exhaust gas 23 can serve for providing heat in a waste heat boiler 24 for generating the process steam 25 required in the post-combustion unit 21.

The cooled furnace exhaust gas 23 and the cooled exhaust gas 13' from the cooler have to have, downstream of the waste heat boiler 24 or 20, a sufficient amount of sensible heat to ensure, together, the necessary drying of the cement raw meal 1 in the case of integrated operation, i.e. in the case of use of the raw material mill 26. In direct operation, the raw material mill 26 is not used and the furnace exhaust gas or the cooled exhaust gas from the cooler is fed to a cooling apparatus 27 or additional waste heat can be withdrawn therefrom for utilization. After the raw material mill 26 or the cooling apparatus 27, the exhaust gas 23 goes to after-treatment in a dust filter 28. The exhaust gas 23 from which the dust has been removed then optionally goes into a flue gas desulfurization plant 29 before finally being fed into the post-combustion unit 21. The flue gas desulfurization plant can operate according to a typical wet-chemical concept as is customary in the flue gas desulfurization of coal-fired power stations. It is naturally also possible to remove dust from and desulfurize the exhaust gas simultaneously in a semi-dry flue gas desulfurization. Here, a moistened sorbent together with recirculated and moistened filter dust is introduced into the exhaust gas upstream of a filter. This filter would then replace the dust filter 28 and the flue gas desulfurization plant 29. To increase the effectiveness of such a semi-dry flue gas desulfurization, the dust filter can also consist of two units 28a and 28b. Here, dust would be removed from the flue gas in the first filter 28a and the sorbent would be introduced into the dust-free exhaust gas after the filter 28a and precipitated in the filter 28b and partly recirculated. The residual $SO_x$ content can optionally be reduced further by means of a downstream fine scrubber, for example an NaOH scrubber.

In the most favorable case, primary measures such as suitable air gradations in combustion are sufficient for satisfactory removal of $NO_x$ as further acidic gas in the exhaust gas which is unfavorable for the post-combustion removal of $CO_2$. If this is not the case, the removal has to be ensured by means of suitable secondary measures. In the more favorable case, removal of oxides of nitrogen by means of SNCR (selective noncatalytic reduction), in which the $NO_x$ content of the exhaust gas is reduced at suitable temperatures (900° C.-1100° C.) within the exhaust gas train by injection of ammonia or urea, is sufficient for this purpose. In the less favorable case, the reduction of $NO_x$ has to take place by means of SCR (selective catalytic reduction), with the removal of oxides of nitrogen taking place in the presence of a catalyst at 300° C.-450° C. by means of injection of ammonia or urea. For the waste heat boiler 24 which may optionally follow, the formation of ammonium sulfates from the ammonia introduced in the SNCR or SCR and the $SO_3$ present in the flue gas have to be taken into account. The ammonium sulfate can form a highly corrosive deposit on the heating surfaces of the boiler. As an alternative, an SCR process after exit of the flue gas from the flue gas desulfurization plant could therefore also be considered. However, the flue gas would firstly have to be reheated here to temperatures suitable for the process by means of a suitable heat transport system in order then to be able to be cooled again in the waste heat boiler 24 located then on the flue gas side downstream of the desulfurization and removal of oxides of nitrogen.

The $CO_2$-rich calciner exhaust gas 17 from the calciner 5 is cooled in the calciner preheater 2 which is separate from the furnace preheater 3. To recirculate a part 17a of the calciner exhaust gas using a recirculation blower, the calciner exhaust gas must firstly be cooled to a temperature acceptable for the blower, for logical reasons. This can be carried out in a further waste heat boiler 30 which utilizes the enthalpy from the calciner exhaust gas for additional generation of process steam for the post-combustion removal of $CO_2$. However, it is more advantageous to design and operate the calciner preheater so that the calciner exhaust gas after passing through the calciner preheater has just the correct temperature for the recirculation blower of from about 380° C. to 450° C., in which case the waste heat boiler 30 could be dispensed with.

A part 17a of the calciner exhaust gas 17 is recirculated to maintain the flow conditions in the calciner 5. The unrecirculated part 17b can be cooled in a further waste heat boiler 31 in order to utilize the heat to generate process steam 25 for the post-combustion unit 21. To improve heat transfer, it can be useful to install one or more high-performance cyclones or simple electrofilters upstream of the waste heat boiler so that the calciner exhaust gas 17 is purified to dust contents of less than 10 g/standard $m^3$, preferably to dust contents of less than 1 g/standard $m^3$. However, a largely complete dust removal to values of less than 100 mg/standard $m^3$, preferably less than 20 mg/standard $m^3$, in a dust filter 32b is carried out at the latest after cooling in the waste heat boiler 31.

As an alternative, the waste heat boiler 30 can be dispensed with when oxy-fuel flue gas 17c which is already cold is fed as quenching gas into the calciner exhaust gas in order to achieve the permissible temperature for the recirculation blower. A dust filter 32a can be installed upstream of the waste heat boiler 31, optionally also upstream of the recirculation offtake. A major part of the heat in the oxy-fuel flue gas 17 could then be utilized in the waste heat boiler 31 in which the technical implementation of the waste heat utilization is then made considerably easier by a low degree of pollution of the flue gas with strongly adhering dust.

Figure 3:
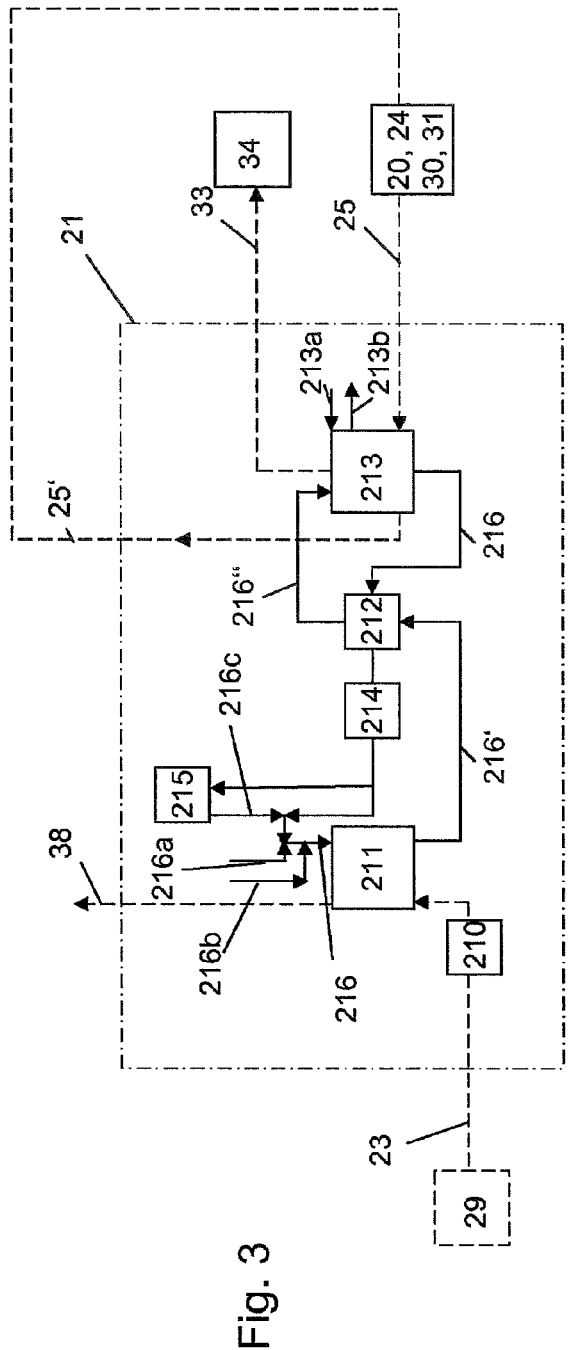
FIG. 3 is a schematic diagram of an embodiment of a post-combustion unit for removal of $CO_2$, as disclosed herein.

The post-combustion unit 21 is shown in detail in FIG. 3 and can consist of a solvent circuit using, for example, monoethanolamine (MEA) as solvent. Many solvents have been developed and tested to date. The invention can be explicitly applied to any other solvent. The furnace exhaust gas 23 which has been treated in the dust filter 28 and in the flue gas desulfurization plant 29 is firstly cooled in a flue gas cooler 210 to about 40° C. before being fed to an absorber 211. A low-$CO_2$ scrubbing medium 216 composed of a solvent and usually water is furthermore present in the absorber.

In the absorber 211, the low-$CO_2$ scrubbing medium 216 absorbs up to 98% of the $CO_2$ from the cooled furnace exhaust gas 23. The residual gas 38 leaves the absorber in a relatively low-$CO_2$, water-saturated state. The scrubbing medium 216' loaded with $CO_2$ is, as a function of the desired desorber pressure (in the case of MEA ~2 bar), brought to a higher pressure level, optionally preheated in a heat exchanger 212, leaves the latter as preheated $CO_2$-loaded scrubbing medium 216" and goes into a desorber 213 where the scrubbing medium is thermally regenerated by the desorber being heated at the bottom by means of the generated process steam 25 and the $CO_2$ thus being separated from the scrubbing medium 216" in a number of stages. In the case of MEA as solvent, about 3200-3600 kJ/$kg_{CO2}$ has to be expected for the heat requirement of the desorber. The condensate 25' formed from the heating of the bottom here goes back into the waste heat boilers 20, 24, 30, 31.

Figure 2:
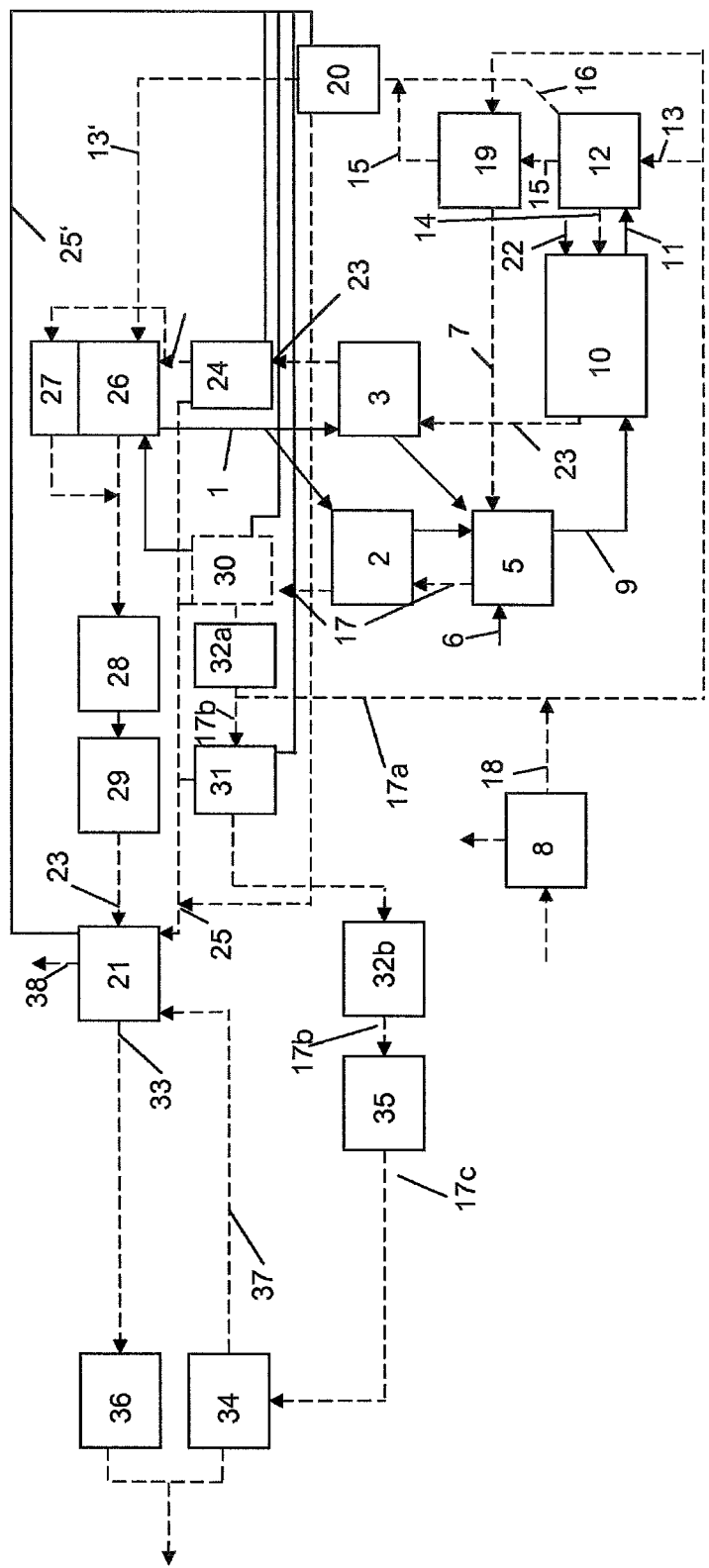
FIG. 2 is a schematic diagram of an embodiment of a plant layout for producing cement clinker with separate $CO_2$ work-up, as disclosed herein.

Not only the low-$CO_2$ and predominantly nitrogen-containing residual gas 38 but also a $CO_2$-rich exhaust gas 33 leave the post-combustion unit 21 and the $CO_2$-rich exhaust gas 33 is subsequently fed to a dedicated $CO_2$ compressor 36 (separate $CO_2$ work-up as per FIG. 2) or together with the calciner exhaust gas 17c to a joint $CO_2$ partial condensation unit 34 (joint $CO_2$ work-up as per FIG. 1). In the latter case, it is advantageous to feed the $CO_2$-rich product gas, which is optionally already at the higher pressure, from the post-combustion unit 33 to exactly the compressor stage suitable for the pressure level. The pressure level is, for example, about 2 bar in the case of the solvent MEA. The $CO_2$ purity of the exhaust gas 33 is typically greater than 95%, preferably greater than 99%.

A major part of the water is condensed back integrated in the desorber or located above the latter by means of cooling water (inlet 213a, outlet 213b) in an "overhead condenser" (desorber main condenser) in order to keep the water loss and the solvent loss via the exiting $CO_2$-rich exhaust gas 33 low. The scrubbing medium 216 which is then low again in $CO_2$ is firstly discharged from the bottom of the desorber 213, preheats the $CO_2$-rich scrubbing medium 216' in the heat exchanger 212, is cooled further in a cooler 214 and goes together with make-up water 216b, which is intended to make up the remaining water loss, back into the absorber 211.

The dust removal in the dust filter 28, the desulfurization in the flue gas desulfurization plant 29 and optionally a removal of oxides of nitrogen have an effect on the operation and the design of the downstream post-combustion unit 21 for the removal of $CO_2$. Many solvents proposed for this purpose, especially amines, are subjected to degradation mechanisms. These can be brought about thermally and also by oxygen and trace materials (e.g. $SO_x$, $NO_x$) in the exhaust gas. For this reason, appropriate dust removal, removal of oxides of nitrogen and desulfurization as mentioned above is extremely advantageous. In the reclaimer 215 for the scrubbing medium, the solvents can be regenerated partially but generally not completely and, in addition, additional heat is required. Fresh solvent 216a (make-up stream) and solvent 216c which has been freed of degradation products in the reclaimer 215 are therefore added at time intervals or continuously to the scrubbing medium 216.

Thus, for example, a series of experiments on the MEA scrub of power station flue gases has indicated the need for a make-up stream of 1.5 kg/$t_{CO2}$, even though the exhaust gas to be treated contains very low residual proportions of $SO_x$ (<4 ppm) as a result of particular measures in the flue gas desulfurization (flue gas cooling and $SO_2$ fine scrub using NaOH). At the usual $SO_2$ concentrations in cement works of up to 2000 ppm or possibly even more due to the absence of the calciner in the furnace exhaust gas path, a secondary measure for flue gas desulfurization, for example a wet scrub using a lime suspension, as is routinely employed for power station flue gases, is undertaken to prevent excessive solvent losses. Subsequent flue gas cooling and a fine scrub by means of NaOH solution can optionally reduce the residual content of $SO_2$ further. The $SO_2$ concentration at the gas-side outlet from the flue gas desulfurization should be reduced to a minimum here in order to achieve the best possible minimization of the degradation of the scrubbing medium. In this way, the residual dust content can also be minimized. The residual dust downstream of the dust filter can, for example, lead to accumulation in the solvent circuit of the post-combustion unit and may have to be separated off from the solvent by means of filters. The dust content of the exhaust gas upstream of the scrub should advantageously be below 140 mg/standard $m^3$. However, it is to be expected that the dust content will in any case be minimized by the additional measures for removal of $SO_2$ in the exhaust gas.

However, as an alternative, other solvents such as aqueous $NH_3$ solutions can also be used. In this case, the $CO_2$ scrub occurs at significantly lower temperatures, typically less than 20° C., preferably less than 10° C. A disadvantage of this process is the use of a toxic and flammable solvent and also the increased energy consumption for cooling flue gas and solvent. In this case, an optionally multistage flue gas cooling system, for example, would have to be provided downstream of the flue gas desulfurization. An advantage of the process is the significantly greater stability of the $NH_4OH$ solution compared to MEA and a lower specific heat requirement in the desorber. Depending on the degree of pollution of the flue gas, the flue gas scrub may be able to be omitted here.

Taking into account the pressure drops and the bottom temperature and pressure of the desorber 213 which are optimal for the scrubbing medium, process steam 25 of sufficient pressure (e.g. 3.5 bar for a steam temperature of >140° C.) has to be generated for heating of the bottom. The condensate 25' from the desorber 213 forms the feed water which is fed into the individual waste heat boilers 20, 24, 30, 31 or into a joint steam drum for the waste heat boilers.

Figure 4:
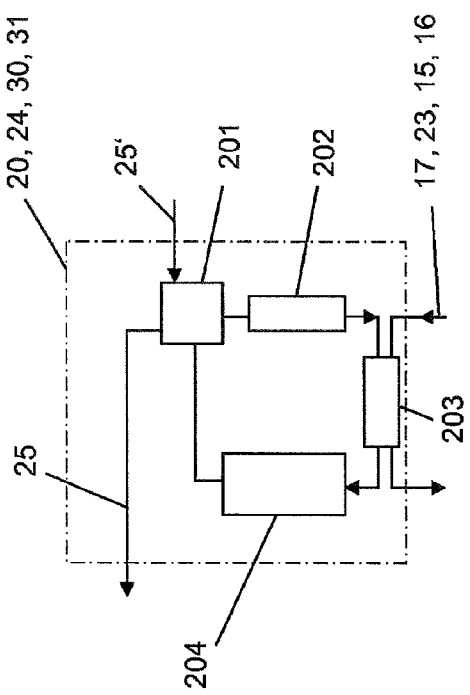
FIG. 4 is a schematic diagram of an embodiment of a waste heat boiler of the present disclosure.

The waste heat boilers 20, 24, 30, 31 can, for example, be configured as natural convection boilers (see FIG. 4) but other designs are also conceivable. The waste heat boiler shown in FIG. 4 consists essentially of a steam drum 201, a downtube 202, a heated part 203 and a riser tube 204. In operation, water runs from the steam drum 201 downward through the downtube 202 and goes into the heated part 203. The heat required for this is covered by the waste heat of the calciner exhaust gas 17, of the furnace exhaust gas 23 and/or of an exhaust gas 15, 16 from the cooler 12. The process steam mixture formed rises upward in the riser tube 204 and goes back into the steam drum 201. The density difference between the water/steam mixture in the riser tube 204 and the water in the downtube 201 drives the circulation. The process steam 25 for operating the bottom in the desorber 213 can then be taken from the steam drum 201.

As an alternative, the waste heat boilers 20, 24, 30, 31 can also operate with a joint steam drum 201. The necessary process steam 25 is then taken from the joint drum and used for heating the bottom of the desorber. Here too, the condensate 25' from the process steam forms the feed water introduced into the steam drum 201.

In the calciner exhaust gas branch, the unrecirculated part 17b of the calciner exhaust gas exiting from the dust filter 32b or the waste heat boiler 31 is optionally cooled further and optionally goes into a subsequent $SO_2$ flue gas scrub 35 which has to meet the particular requirements of the calciner exhaust gas from the oxy-fuel process. The calciner exhaust gas entering the flue gas scrub 35 can have up to three times the $SO_x$ concentration of the exhaust gas from conventional cement works processes. To avoid corrosion problems on liquefaction and to obtain very low $SO_x$ contents in the $CO_2$ stream to be stored, the residual $SO_x$ content nevertheless has to be kept to a minimum. In the case of a wet scrub, the $SO_2$ absorption in the limestone suspension and subsequent oxidation have to be brought about in two tanks which are separated from one another on the gas side. As an alternative, the dust removal in the dust filter 32a/32b and the desulfurization in the flue gas scrub 35 can in this case, too, be carried out as semi-dry flue gas scrub in one unit. To avoid corrosion problems and to obtain very low $NO_x$ contents in the $CO_2$ stream to be stored, the residual $NO_x$ content of the calciner exhaust gas also has to be kept as low as possible. Possible minimization methods similar to those for the furnace exhaust gas (primary measures, SNCR, SCR) can be considered. An SCR removal of oxides of nitrogen can be installed either upstream or downstream of the recirculation offtake. Ammonium sulfates formed from $SO_3$ and $NH_3$ can in this case, too, promote a strongly corrosive deposit on the heating surfaces in the downstream waste heat boiler 31. As an alternative, the removal of oxides of nitrogen from the flue gas by means of SCR can therefore likewise take place after the desulfurization, after the flue gas has been heated again to about 250° C.-350° C. by means of, for example, a heat transport system. The waste heat boiler 31 would then follow the removal of oxides of nitrogen.

The calciner exhaust gas from which dust, sulfur oxides and optionally oxides of nitrogen have been removed subsequently goes either together with or separately from the $CO_2$-rich product gas 33 from the post-combustion unit 21 into a $CO_2$ partial condensation unit 36. The liquefaction of the calciner exhaust gas or the joint liquefaction of the calciner exhaust gas together with the $CO_2$-rich flue gas from the post-combustion unit 21 forms, depending on the required purity of the $CO_2$ to be stored and the flue gas fed in, a $CO_2$-containing residual stream 37 (vent gas) which has to be discharged. The $CO_2$ concentration of this stream is normally in the range from 20% to 60%.

$CO_2$ can, when sufficient process waste heat is available, additionally be separated off from the vent gas stream in the post-combustion unit 21. In the case of separate $CO_2$ work-up post combustion, the $CO_2$-containing vent gas stream 37 from the $CO_2$ partial condensation unit 34 can additionally be fed to the post-combustion unit 21, freed of $CO_2$ and the $CO_2$ additionally separated off there can be passed to the $CO_2$ compressor 36, which results in an increase in the total $CO_2$ removal. In the case of the joint $CO_2$ work-up post combustion (as per FIG. 1), the $CO_2$-containing residual stream 37 from the $CO_2$ partial condensation unit 34 can likewise be fed to the post-combustion unit 21, freed of $CO_2$ and the additionally absorbed $CO_2$ can thus be conveyed back into the $CO_2$ partial condensation unit 34. An increase in the total $CO_2$ removal can also be achieved in this case. Contaminants due to entry of false air and an excess of oxygen in the calciner exhaust gas 17c may be able to be avoided to such an extent that, together with the $CO_2$-rich stream from the post-combustion unit, a dry $CO_2$ concentration corresponding to the desired concentration for transport of the compressed $CO_2$ is achieved. In this case, the original $CO_2$ partial condensation unit 34 can be replaced by a simple $CO_2$ compressor, e.g. 36. A vent gas stream is no longer formed here and the total flue gas entering the unit goes to further transport.

The amount of process steam 25 produced can be adapted by means of the quality of the underlying partial oxy-fuel process. The higher the process integration of the partial oxy-fuel process, the higher the efficiency thereof and the less waste heat arises. However, the higher the efficiency, the more complex does the process become. It therefore appears to be sensible to operate the process integration of the underlying oxy-fuel process only to such an extent that just sufficient waste heat for satisfactory post-combustion removal of $CO_2$ from the furnace exhaust gas 23 is available. If, despite extreme integration measures (for example very many preheating stages, maximum exploitation of the heat in the exhaust gas from the cooler), an excess of waste heat is available, the oxy-fuel firing and thus the degree of calcination in the calciner 5, for example, can be reduced to such an extent that the amount of $CO_2$ in the furnace exhaust gas 23 matches the available waste heat as a result of the increased residual calcination proportion and additionally the increased firing power in the rotary tube furnace 10 brought about thereby. In this way, the oxy-fuel firing power can be reduced and electric energy for the fractionation of air can thus be saved. A similar effect can be achieved by lowering of the proportion of cement raw meal in the preheaters. The cement raw meal preheated there then has a higher temperature and thus a higher degree of calcination in the lowermost preheating stage. Here too, part of the calcination is shifted from the calciner 5 into the rotary tube furnace 10 or the furnace exhaust gas path.

The invention claimed is:

1. A process for producing cement clinker from cement raw meal, comprising:
   a. part of the cement raw meal is preheated in a calciner preheater and the other part of the cement raw meal is preheated in a furnace preheater;
   b. the cement raw meal which has been preheated in the calciner preheater and in the furnace preheater is pre-calcined in a calciner operated by the oxy-fuel process;
   c. the precalcined cement raw meal is fired in a furnace;
   d. the fired cement raw meal is cooled in a cooler;
   e. the calciner preheater is operated using calciner exhaust gases from the calciner; and
   f. the furnace preheater is operated using furnace exhaust gases from the furnace;
   g. an entrained flow reactor is used as calciner, with a part of the calciner exhaust gas being, after having been utilized in the calciner preheater, recirculated to the calciner; and
   h. the furnace exhaust gas is subjected to a post-combustion removal of $CO_2$, wherein a heat requirement for the post-combustion removal of $CO_2$ is covered by the waste heat from an unrecirculated part of the calciner exhaust gas, of the furnace exhaust gas and/or of an exhaust gas from the cooler.

2. The process of claim 1, wherein the part of the calciner exhaust gas which is recirculated to the calciner is heated by exhaust gases from the cooler.

3. The process of claim 1, wherein the heat requirement for the post-combustion removal of $CO_2$ is partly covered by the waste heat of the unrecirculated part of the calciner exhaust gas after utilization in the calciner preheater.

4. The process of claim 1, wherein the heat requirement for the post-combustion removal of $CO_2$ is partly covered by the waste heat of the furnace exhaust gas after utilization in the furnace preheater.

5. The process of claim 1, wherein the calciner exhaust gas after utilization in the calciner preheater and/or the furnace exhaust gas after utilization in the furnace preheater is fed to a waste heat boiler for generating process steam, with the process steam generated being used in the post-combustion removal of $CO_2$.

6. The process of claim 1, wherein the unrecirculated part of the calciner exhaust gas is subjected to a removal of $CO_2$ by way of $CO_2$ liquefaction and a $CO_2$-containing residual stream formed here is subjected together with the furnace exhaust gas to the post-combustion removal of $CO_2$.

7. The process of claim 1, wherein the oxy-fuel process and the post-combustion removal of $CO_2$ are matched to one another in such a way that the process heat available for the post-combustion removal of $CO_2$ from the at least one part of the calciner exhaust gas, the furnace exhaust gas and/or an exhaust gas from the cooler is completely utilized.

8. The process of claim 7, wherein an excess of process heat is compensated by a decrease in an existing deficiency of process heat by means of increasing the degree of calcination in the calciner and the preheater thereof.

* * * * *